(12) United States Patent
Niiyama et al.

(10) Patent No.: US 7,864,287 B2
(45) Date of Patent: Jan. 4, 2011

(54) LIQUID CRYSTAL COMPOSITION, LIQUID CRYSTAL OPTICAL DEVICE, AND METHOD OF PRODUCING LIQUID CRYSTAL OPTICAL DEVICE

(75) Inventors: Satoshi Niiyama, Chiyoda-ku (JP); Remi Kawakami, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 173 days.

(21) Appl. No.: 12/344,610

(22) Filed: Dec. 29, 2008

(65) Prior Publication Data

US 2009/0128770 A1    May 21, 2009

Related U.S. Application Data

(63) Continuation of application No. PCT/JP2007/062927, filed on Jun. 27, 2007.

(30) Foreign Application Priority Data

Jun. 27, 2006    (JP) ............................. 2006-176079

(51) Int. Cl.
C09K 19/02    (2006.01)
G02F 1/1333    (2006.01)

(52) U.S. Cl. ............................. 349/186; 349/86; 349/88; 349/177; 430/20

(58) Field of Classification Search .................. 349/86, 349/88, 177, 186; 430/20
See application file for complete search history.

(56) References Cited

U.S. PATENT DOCUMENTS

| | | |
|---|---|---|
| 4,688,900 A | 8/1987 | Doane et al. |
| 4,818,070 A | 4/1989 | Gunjima et al. |
| 4,834,509 A | 5/1989 | Gunjima et al. |
| 5,103,327 A | 4/1992 | Hirai et al. |

(Continued)

FOREIGN PATENT DOCUMENTS

JP    2-272090    11/1990

(Continued)

OTHER PUBLICATIONS

U.S. Appl. No. 12/352,867, filed Jan. 13, 2009, Niiyama, et al.

*Primary Examiner*—Michael H Caley
(74) *Attorney, Agent, or Firm*—Oblon, Spivak, McClelland, Maier & Neustadt, L.L.P.

(57) ABSTRACT

The present invention provides a liquid crystal optical device showing small haze value in transparent state and being excellent in productivity, a process for producing such a device, and a liquid crystal composition for producing such a device.

The liquid crystal composition of the present invention is a liquid crystal composition containing a nematic liquid crystal and at least two types of optically active materials having different optical rotatory directions, wherein one of the optically active materials having different optical rotatory directions is a non-curable compound, the other one of the optically active materials is a curable compound, and the liquid crystal composition as a whole shows a nematic phase. By sandwiching the liquid crystal composition between inner faces of a pair of insulation substrates at least one of which is transparent, and curing the curable compound in a state that the liquid crystal is aligned, it is possible to obtain a liquid crystal optical device showing small haze value in transparent state and being excellent in productivity.

14 Claims, 1 Drawing Sheet

U.S. PATENT DOCUMENTS

| | | |
|---|---|---|
| 5,150,232 A | 9/1992 | Gunkima et al. |
| 5,162,934 A | 11/1992 | Gunjima et al. |
| 5,196,952 A | 3/1993 | Hirai et al. |
| 5,200,845 A | 4/1993 | Crooker et al. |
| 5,216,531 A | 6/1993 | Hirai et al. |
| 5,235,445 A | 8/1993 | Hirai et al. |
| 5,437,811 A | 8/1995 | Doane et al. |
| 6,034,753 A * | 3/2000 | Li et al. .................. 349/98 |
| 6,122,021 A | 9/2000 | Hirai et al. |
| 6,674,494 B2 | 1/2004 | Niiyama et al. |
| 6,723,393 B1 | 4/2004 | Niiyama et al. |
| 7,011,870 B2 | 3/2006 | Niiyama et al. |
| 7,011,913 B2 * | 3/2006 | Teranishi et al. .............. 430/20 |

FOREIGN PATENT DOCUMENTS

| | | |
|---|---|---|
| JP | 8-304830 | 11/1996 |
| JP | 10-195445 | 7/1998 |
| JP | 2000-119656 | 4/2000 |
| JP | 2000-178557 | 6/2000 |
| JP | 2004-198949 | 7/2004 |
| WO | WO 94/23331 | 10/1994 |

* cited by examiner

LIQUID CRYSTAL COMPOSITION, LIQUID CRYSTAL OPTICAL DEVICE, AND METHOD OF PRODUCING LIQUID CRYSTAL OPTICAL DEVICE

TECHNICAL FIELD

The present invention relates to a liquid crystal composition, a liquid crystal optical device employing it, and a process for producing the liquid crystal optical device.

BACKGROUND ART

Liquid crystal optical devices have merits such as low power consumption, small thickness or light weight, and they are widely used for many electronic devices such as cellphones, digital cameras, portable information devices or TVs. Among these, in recent years, liquid crystal optical devices are proposed, in which electric field is controlled to control alignment of liquid crystal molecules to thereby change a light-scattering state.

Further, liquid crystal optical devices (hereinafter referred to as liquid crystal/cured material composite device) such as LCPC (Liquid Crystal Polymer Composite), PDLC (Polymer Dispersed Liquid Crystal) or NCAP (Nematic Curvilinear Aligned Phase) which each comprises a composite of liquid crystal and cured material, are known (refer to Patent Document 1). In general, in a liquid crystal/cured material composite device, a nematic liquid crystal phase is uniformly dispersed in a cured material phase, the device is configured to control transparency-scattering of light by switching matching/mismatching of refractive indexes of the cured material phase and the liquid crystal phase by applying a voltage. This liquid crystal/cured material composite device requires no polarizer in principle, and accordingly, it has high light transmittance. For this reason, for example, such a device is suitable for applications such as light shutters to be used for e.g. a sunroof for an automobile, show windows or various types of bulletin boards capable of displaying characters or patterns, or instrument panels or windows of automobiles. As an example of such a liquid crystal/cured material composite device, a device showing a transparent state at a time of no voltage application, is also reported (refer to Patent Document 2).

However, most of the above liquid crystal/cured material composite devices are usually required to contain the cured material in an amount of usually at least 20 mass %, preferably at least 30 mass % (refer to Patent Documents 3 and 4). Here, since the liquid crystal phase shows a plurality of refractive indices while the cured material phase usually shows only one refractive index, there has been a problem that when the device is used for e.g. a large window glass, the haze value of the device in transparent state is high except in a direction where the refractive indexes agree with each other. Namely, there has been a problem that in the transparent state, when a panel is observed in a direction perpendicular to the panel, the panel looks transparent, but when the panel is observed in a slant direction, the panel looks not sufficiently transparent. Further, in a case of liquid crystal/cured material composite device produced by a polymerization-phase-separation method (a method of producing phase separation of liquid crystal and cured material by polymerizing a liquid crystal mixture containing more amount of monomer than liquid crystal, that is described in examples of Patent Documents 3 and 4), when a liquid crystal phase having high heat-resistant temperature, that is, high phase-transition temperature $T_c$ is required, in order to prevent liquid crystal phase from segregating in a uniform liquid crystal mixture before polymerization, it is necessary to polymerize the liquid crystal mixture while it is heated. In order to solve the above two problems, a PSCT (Polymer Stabilized Cholesteric Texture) is disclosed (refer to Patent Document 5), which is produced by adding a small amount of curable compound to a chiral nematic liquid crystal having a helical pitch selectively reflecting visible light, to stabilize focal conic alignment of the chiral nematic liquid crystal so that the liquid crystal shows a scattering state at a time of no voltage application.

Patent Document 1: U.S. Pat. No. 4,688,900
Patent Document 2: JP-A-2000-119656
Patent Document 3: U.S. Pat. No. 4,834,509
Patent Document 4: U.S. Pat. No. 5,200,845
Patent Document 5: U.S. Pat. No. 5,437,811

DISCLOSURE OF THE INVENTION

Problems to be Solved by the Invention

However, in the PSCT disclosed in Patent Document 5, when a liquid crystal optical device showing a light-scattering state at a time of no-voltage application and showing a transparent state at a time of voltage application is provided, it is necessary to cure a curable compound while a voltage is applied to the liquid crystal composition. Meanwhile, in a case of providing a liquid crystal optical device showing a transparent state at a time of no voltage application and showing a scattering state at a time of voltage application, it is necessary to carry out rubbing treatment of a substrate surface on which a liquid crystal composition contacts. For these reasons, there has been a problem that particularly in a case of large-sized liquid crystal optical device, it is difficult to produce entirety of such a device uniformly, and thus, its productivity is poor.

The present invention has been made under the circumstances, and it is an object of the present invention to provide a liquid crystal optical device showing low haze value in a transmission state and excellent in productivity, a process for producing such a device, and a liquid crystal composition for its production.

Means for Solving the Problems

The present invention has been made to solve the above problems, and provides the following invention.

(1) A liquid crystal composition containing a nematic liquid crystal and at least two types of optically active materials having different optical rotatory directions, wherein one of the optically active materials having different optical rotatory directions is a non-curable compound, the other one of the optically active materials is a curable compound, and the liquid crystal composition as a whole shows a nematic phase. From this composition, a liquid crystal optical device showing low haze value in a transparent state, and excellent in productivity, can be obtained.

(2) The liquid crystal composition according to (1), which shows a chiral nematic phase when the optically active material being a curable compound is not present, and which as a whole shows a nematic phase when the liquid crystal composition contains the optically active material being a curable compound.

(3) The liquid crystal composition according to (1) or (2), which is a liquid crystal composition further containing a curable compound that is not an optically active material. By this composition, it is possible to improve transparent-scattering characteristic of liquid crystal optical device.

(4) The liquid crystal composition according to any one of (1) to (3), wherein the total amount of the curable compound is from 0.1 to 20 mass % based on the total amount of the liquid crystal composition. From this composition, a liquid crystal optical device showing securely low haze value in transparent state can be obtained.

(5) The liquid crystal composition according to any one of (1) to (4), which shows a twist angle of at most 360° when it is sandwiched between a pair of substrates at least one of which has an inner surface provided with an alignment film having a pretilt angle of at most 10°. From this composition, a liquid crystal optical device showing low haze value in transparent state and excellent in productivity is securely obtained.

(6) The liquid crystal composition according to any one of (1) to (5), which has positive dielectric anisotropy. From this liquid crystal composition, a liquid crystal optical device that shows a transparent state at a time of voltage application is obtained.

(7) A process for producing liquid crystal composition, which comprises a step of adding to a composition containing a nematic liquid crystal and at least one type of first optically active material and showing a chiral nematic phase, at least one type of second optically active material having an optical rotatory direction different from the optical rotatory direction of the first optically active material, in an amount that makes the liquid crystal composition as a whole shows a nematic phase; wherein one of the first optically active material and the second optically active material is a curable compound, and the other one is a non-curable compound.

(8) The process for producing liquid crystal composition according to (7), wherein the first optically active material is a non-curable compound and the second optically active material is a curable compound.

(9) A liquid crystal optical device comprising a pair of insulative substrates at least one of which is transparent, an electrode formed on an inner face of each of the insulative substrates, and a composite of liquid crystal and cured material sandwiched between the inner faces of the insulative substrates;

wherein the composite is obtainable by curing the curable compound in the liquid crystal composition as defined in any one of (1) to (6) in a state that the liquid crystal composition is sandwiched between the inner faces of the insulative substrates and that the liquid crystal is aligned. By this construction, a liquid crystal optical device showing low haze in transparent state and excellent in productivity is obtained.

(10) The liquid crystal optical device according to (9), which is obtained by curing the curable compound in a state that no voltage is applied to the electrodes.

(11) The liquid crystal optical device according to (9) or (10), wherein at least one of the insulative substrates is provided with an alignment film having a pretilt angle of at least 60°. By this construction, it is possible to omit rubbing treatment.

(12) A process for producing liquid crystal optical device having a composite of liquid crystal and cured material, which comprises a step of forming an electrode on each inner face of a pair of insulative substrates at least one of which is transparent, a step of laminating the insulative substrates so as to sandwich the liquid crystal composition as defined in any one of (1) to (6) between them so that the inner faces of the respective insulative substrates are opposed to each other, and a step of curing the curable compound in the liquid crystal composition in a state that the liquid crystal composition is sandwiched between the inner faces of the insulative substrates and that the liquid crystal is aligned, to form the composite. By this method, a liquid crystal optical device showing low haze value in transparent state and excellent in productivity is obtained.

(13) The process for producing liquid crystal optical device according to (12), wherein the curing of the curable compound is carried out in a state that no voltage is applied to the electrodes.

(14) The process for producing liquid crystal device according to (12) or (13), which further comprises a step of forming on at least one of the insulative substrates an alignment film having a pretilt angle of at least 60°. By this method, it is possible to omit rubbing treatment.

Effects of the Invention

According to the present invention, it is possible to provide a liquid crystal device having low haze value in transparent state and excellent in productivity, a process for producing such a device, and a liquid crystal composition for the device.

BRIEF EXPLANATION OF NUMERALS

1: Liquid crystal optical device
11: First transparent substrate
12: First transparent electrode
13: First insulation film
14: First alignment film
21: Second transparent substrate
22: Second transparent electrode
23: Second insulation film
24: Second alignment film
30: Sealing member
40: Spacer
50: Composite layer

BEST MODE FOR CARRYING OUT THE INVENTION

Now, embodiments of the present invention will be described. Here, the present invention is by no means limited to these embodiments. Further, in order to simplify explanation, the following description and drawings are appropriately simplified. From now, a composite of liquid crystal and cured material is referred to as "liquid crystal/cured material composite" or simply "composite".

Figure 1:
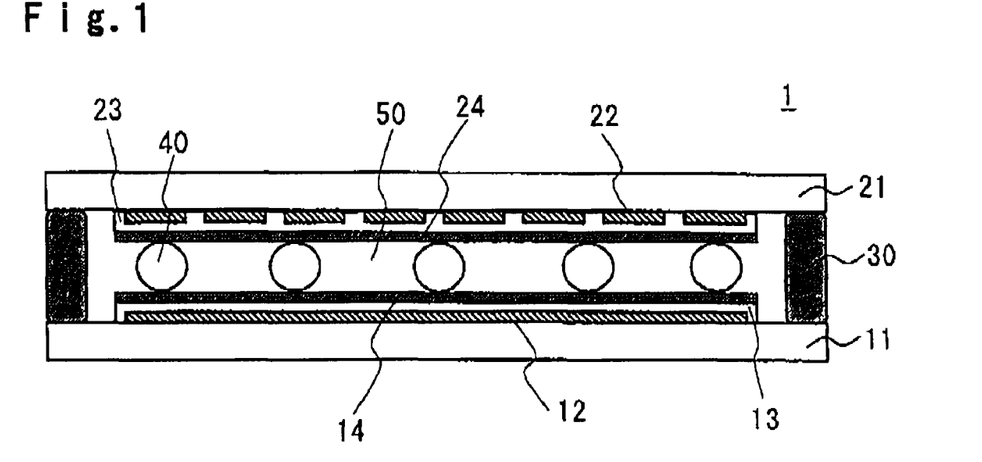
FIG. 1: A view schematically showing the construction of a liquid crystal optical device according to an embodiment of the present invention.

FIG. 1 is a cross sectional view schematically showing an example of the construction of a liquid crystal optical device according to an embodiment of the present invention. As shown in FIG. 1, a liquid crystal optical device 1 according to an embodiment of the present invention comprises a first transparent substrate 11, a first transparent electrode 12, a first insulation film 13, a first alignment film 14, a second transparent substrate 21, a second transparent electrode 22, a second insulation film 23, a second alignment film 24, a sealing member 30, a spacer 40 and a composite layer 50.

Specifically, the liquid crystal optical device 1 has a construction in which the first transparent substrate 11 and the second transparent substrate 12 are opposed to each other and the first and second transparent substrates 11, 21 sandwich the composite layer 50 of liquid crystal/cured material.

The first and second transparent substrates 11, 12 are each an insulative substrate, and for example, it is a glass substrate, a resin substrate or a resin film substrate made of e.g. polycarbonate or an acrylic resin. Here, in this embodiment, the first and second transparent substrates 11, 21 are employed, but both of these substrates are not necessarily transparent, and it is sufficient that only one substrate is transparent.

Further, the shape of these insulative substrates may be a flat plate, or it may be entirely or partially curved. The thickness of the insulative substrates may be appropriately selected, and usually, it is preferably from 0.4 to 10 mm.

On an inner face of the first transparent substrate 11, a plurality of first transparent electrodes 12 are formed in a stripe shape. Meanwhile, on an inner face of the second transparent substrate 21, a plurality of second transparent electrodes 22 are formed in a stripe shape. Here, the plurality of second transparent electrodes 22 are formed so as to cross substantially perpendicularly to the plurality of first transparent electrodes 12. The first and the second transparent electrodes 12, 22 are each made of e.g. ITO (Indium Tin Oxide). Either one of the first and the second transparent electrodes 12, 22 may be reflective electrodes of e.g. Al or dielectric multilayer film. Of course the shape of electrode is not limited to a perpendicular stripe shape, but the electrode may cover entire substrate surface or it may have a shape capable of displaying a specific mark or a character.

The first and the second insulation films 13, 23 are formed so as to cover the first and the second transparent electrodes 12, 22, respectively. The first and the second insulation films 13, 23 are provided for the purpose of improving electric insulation, and they are made of a metal oxide such as $SiO_2$, $TiO_2$ or $Al_2O_3$ or other insulative materials. Here, the first and the second insulation films 13, 23 are not essential.

On the first and the second insulation films 13, 23, the first and the second alignment films 14, 24 are formed respectively. The alignment films 14, 24 are formed so as to contact with a liquid crystal in the composite layer 50 to align the liquid crystal in a predetermined direction. Here, at least one of the alignment films formed on the transparent substrates 11, 21, preferably aligns the liquid crystal vertically to the inner faces of the transparent substrates 11, 21. Specifically, the alignment film has a pretilt angle of preferably at least 60°, more preferably at least 80°, particularly preferably at least 85°. By this construction, it is possible to uniformly align entire liquid crystal composition showing nematic phase without carrying out rubbing treatment. As a result, it is is possible to uniformize optical characteristics of a liquid crystal optical device after curing even if the device has a large area.

The sealing member 30 is formed between the first and second transparent substrates 11, 21 and along the periphery of the first and second transparent substrates 11, 21. The first and second transparent substrates 11, 21 are joined by means of the sealing member. For the material of the sealing member 30, e.g. a UV curable resin or a thermosetting resin is employed. The distance between the inner faces of the first and second transparent substrates, 11, 21, that is, the thickness of the composite layer 50 (cell gap) is constant, and the height of the sealing member 30 is equal to the distance between inner faces of the first and second transparent substrates 11, 21.

The liquid crystal optical device 1 of FIG. 1 has a flat shape, but the liquid crystal optical device of the present invention does not necessarily have a flat shape, but it may be partially or entirely curved depending on its application. Namely, it may have a three-dimensional shape. However, also in this case, the distance between inner faces of the first and second transparent substrate 11, 12, that is, the thickness of the composite layer 50 (cell gasp) is constant.

The spacer 40 is uniformly spread in a space enclosed by the first and second transparent substrates 11, 21 and the sealing member 30, The spacer 40 controls cell gap. The cell gap, that is the diameter of the spacer 40, is preferably from 2 to 50 μm, more preferably from 4 to 30 μm. When the cell gap is too small, the contrast between transparent state and scattering state decreases, and if the cell gap is too large, driving voltage increases. The spacer 40 is a hard material such as glass particles, silica particles or crosslinked acryl particles. Here, the spacer 40 is not necessarily spherical particles but it may be a rib-shaped spacer formed on one of the substrates.

The composite layer 50 is sealed in a space (hereinafter it may be referred to as cell space) enclosed by the first and second transparent substrates 11, 21 and the sealing member 30. The composite layer 50 is made of a liquid crystal/cured material composite obtained by polymerizing and curing a curable compound in the liquid crystal composition of the present invention in a state that the liquid crystal composition is filled in a cell space and the liquid crystal is aligned. The content of the curable compound in the liquid crystal composition (this substantially equals to the content of the cured material of the curable compound contained in the liquid crystal/cured material composite) is preferably from 0.1 to 20 mass %. If it is less than 0.1 mass %, in scattering state of the liquid crystal/cured material composite, the liquid crystal phase can not be divided into domain structures each having more effective shape, and it is not possible to obtain a desired transparent-scattering characteristics. On the other hand, when it exceeds 20 mass %, in the same manner as conventional liquid crystal/cured material composite, the haze value in transparent state increases. Further, the content of the curable compound in the liquid crystal composition is more preferably from 0.5 to 10 mass %, since in this composition, it becomes possible to increase scattering intensity in scattering state of the liquid crystal/cured material composite, and to decrease a voltage at which transparent-scattering state is switched.

However, in a case where it is preferred to employ a curable compound having a mesogenic structure as a curable compound that is not an optically active material as to be described later, increase of haze value in transparent state of a liquid crystal phase obtained is small, and in this case, a liquid crystal device which shows good characteristics is obtained even if the content of curable compound having a mesogenic structure exceeds 10 mass %. Accordingly, in a case of liquid crystal composition containing a curable compound having a mesogenic structure to be described later, the total amount of curable composition is preferably at most 20 mass %, particularly preferably at most 15 mass %.

As described above, the content of curable compound in the liquid crystal composition is preferably from 0.1 to 20 mass % based on the liquid crystal composition, and it is preferably appropriately selected from a range of from 0.1 to 20 mass % depending on HTP (Helical Twisting Power) of the curable compound that is an optically active material. When the curable compound being an optically active material has high HTP, only a small amount of the compound is required to be added to a chiral nematic liquid crystal being a mixture of nematic liquid crystal and a non-curable optically active material, to prepare a liquid crystal composition that as a whole shows a nematic phase. For example, in a case of employing a curable compound being an optically active material having a large HTP (HTP is about from 30 to 60), the most preferred content of the curable compound in the liquid crystal composition is from 0.5 to 5 mass %. When the HTP of the curable compound being an optically active material is smaller than 30, the content is preferably from 0.5 to 10 mass % as described above.

The content of non-curable optically active material in the liquid crystal composition is determined depending on HTP of the non-curable optically active material. Namely, when the non-curable optically active material has high HTP, the amount of non-curable optically active material for obtaining a desired pitch in a liquid crystal (a liquid crystal showing chiral nematic phase) in the liquid crystal/curable material composite, may be small. For example, when a non-curable optically active material having a HTP of from 20 to 50 is employed, the content of the optically active material in the liquid crystal composition is preferably from 0.5 to 10 mass %, particularly preferably from 1 to 5 mass %.

The liquid crystal composition of the present invention is a liquid crystal composition containing at least two types of optically active materials showing different optical rotatory directions and a nematic liquid crystal, and the liquid crystal composition as a whole shows nematic phase. The optical rotatory directions means dextro-rotatory and levo-rotatory, and "having different optical rotatory directions" means when one type of the material shows dextro-rotatory, the other material shows levo-rotatory. As the nematic liquid crystal, two or more types of nematic liquid crystals may be combined for use. Usually, when an optically active material showing optical rotatory, that is, a chiral agent, in an amount of at least a predetermined amount is added to a nematic liquid crystal, the nematic liquid crystal changes into a chiral nematic liquid crystal with phase transition (it is also referred to as cholesteric liquid crystal) having a helical structure. Here, the period of helical structure, that is, a helical pitch p, is represented by $p=1/(c \cdot HTP)$ using the content c of chiral agent and HTP (Helical Twisting Power). In the present invention, optically active materials having different optical rotatories, specifically, a chiral agent of dextro-rotatory and a chiral agent of levo-rotatory are added to a nematic liquid crystal to substantially maximize p to make the liquid crystal composition as a whole show a nematic phase. "Substantially maximize p" means that, to be described later, $p \geq d$ is satisfied provided that a cell gap is d. By this construction, the liquid crystal composition of the present invention as a whole shows a nematic phase even if it is produced by adding a chiral agent to a nematic liquid crystal.

Since a common chiral nematic liquid crystal shows a plurality of stable alignments such as planar alignment, focal conic alignment or their mixed alignment, it has been difficult to achieve uniform liquid crystal alignment in one direction without applying an electric field. On the other hand, in a liquid crystal composition showing nematic phase, liquid crystal alignment in one direction can be realized by using an alignment film. Particularly, in a case of employing a so-called vertical alignment film showing high pretilt angle, it becomes easily possible to uniformly align a liquid crystal composition vertically to a substrate provided with a transparent electrode. Here, a nematic phase means a state that provided that a twist angle of the liquid crystal between the first transparent substrate 11 and the second transparent substrate 21 is θ, $θ \leq 360°$ is satisfied, and it is preferred that $θ \leq 180°$ is satisfied. In other words, when the cell gap is d, a nematic phase means that the helical pitch satisfies $p \geq d$, and it is preferred that $p \geq 2d$. When $θ > 360°$, that is $p < d$, is satisfied, the nematic liquid crystal becomes close to the state of chiral nematic liquid crystal, and it becomes difficult to achieve uniform liquid crystal alignment in one direction by an alignment film. The twist angle of a nematic liquid crystal can be measured, for example, by sandwiching the liquid crystal composition between a pair of transparent substrates at least one of whose inner face is provided with an alignment film subjected to a rubbing treatment and showing a pretilt angle of at most 10°, and observing transmitted light by a polarizing microscopic observation while a polarizer is rotated. Further, the twist angle can be obtained by sandwiching the liquid crystal composition in a wedge-shaped cell and observing the distance between disclination lines, Among the two optically active materials showing different optical rotatory directions in the liquid crystal composition of the present invention, with respect to the optical rotatory direction, one of the optically active materials is a non-curable compound, and the other one of the optically active materials is a curable compound. Using this curable compound, after the liquid crystal composition is sandwiched between substrates provided with electrodes, the curable compound is cured to form a plurality of domains in the liquid crystal phase. At the same time, since the curing causes polymerization, the curable optically active compound loses a part or all of optical rotatory function as a chiral agent. Accordingly, the nematic liquid crystal changes into a chiral nematic liquid crystal with phase transition in a process of curing the curable compound by the effect of non-curable chiral agent remained. As the non-curable chiral agent, S-811, S-1011 or S-2011 manufactured by Merck & Co., Inc. may, for example, be mentioned. These chiral agents show levo-rotatory. In this case, a curable chiral agent contained at the same time is preferably an optical rotatory compound of dextro-rotatory such as Paliocolor LC 756 manufactured by BASF Corporation. Of course, it is possible to use a non-curable chiral agent of dextro-rotatory and a curable chiral agent that is a levo-rotatory curable compound. It is possible to provide a dextro-rotatory compound with relatively low cost by preparing the optical rotatory compound from an optical rotatory material present in natural world. Further, as the non-curable chiral agent, one of levo-rotatory and one of dextro-rotatory may be used in combination, and in the same manner, for the curable chiral agent, one of levo-rotatory and one of dextro-rotatory may be used in combination. By configuring the liquid crystal composition so that the liquid crystal composition before the curable compound is cured substantially shows a nematic phase and the liquid crystal phase after the curable compound is cured forms a chiral nematic phase, then, the effect of the present invention can be exhibited regardless of the combination of levo-rotatory and dextro-rotatory.

A liquid crystal obtained by curing the curable compound in the liquid crystal composition of the present invention is considered to be a chiral nematic liquid crystal having a liquid crystal physical properties substantially equal to those of a mixture that is the remainder of the liquid crystal composition of the present invention other than the curable compound (including the curable compound other than the curable chiral agent), except in the influence of the cured material. Accordingly, the mixture is prepared so as to satisfy liquid crystal properties of chiral nematic liquid crystal required for the liquid crystal/cured material composite. The degree of optical rotatory and the amount of the curable chiral agent to be added to the mixture need to be ones capable of canceling chiral nematic properties of the mixture and converting them to nematic properties. In this requirement, the degree of optical rotatory of the curable chiral agent or its amount in the liquid crystal composition are not restricted by the degree of optical rotatory (in the opposite direction) of the non-curable chiral agent or its amount in the liquid crystal composition.

The effect of the present invention can be exhibited in both of the cases where the dielectric anisotropy (Δ∈) of the liquid crystal composition is positive and where it is negative, and the effect can be exhibited in cases where the pretilt angle of the alignment film provided on an inner face of a substrate is at most 10° and where it is at least 60°. Further, a rubbing treatment may be applied to the alignment film.

A case where the liquid crystal/cured material composite obtained from the liquid crystal composition of the present invention shows a uniform scattering state at a time of no voltage application and shows the minimum haze in transparent state at a time of voltage application, and thus the contrast between transparent and scattering is high, is a case where the liquid crystal composition having positive dielectric anisotropy is disposed so as to contact with an alignment film having a pretilt angle of approximately 90° so that the liquid crystal composition is aligned vertically to the substrate with electrode. Here, when the chiral agent having curability contained in the liquid crystal composition is cured, a cured material produced by the curing reaction can efficiently divide chiral nematic phase produced in the process of curing reaction into a plurality of domains. Accordingly, a liquid crystal optical device showing a scattering state at a time of no is voltage application and a transparent state at a time of voltage application can be extremely easily obtained from the liquid crystal composition of the present invention. The plurality of domains divided by the cured material are assumed to have different average refractive indexes, and incident light of large area, its haze value in transparent state is small and transparency is good on the angle of observing the device.

Here, as described above, the polarity of the dielectric anisotropy may be any one of positive or negative, but in order to reduce driving voltage, the dielectric anisotropy is preferably high. Further, in order to improve transparent-scattering contrast by increasing scattering intensity, it is preferred to increase the refractive index anisotropy (Δn) of the liquid crystal composition. On the other hand, if the dielectric anisotropy is too high, the electric insulation performance (specific resistance value) may decrease. Further, if the refractive index anisotropy is too high, the durability against UV light may decrease.

Further, in the liquid crystal composition of the present invention, a curable compound that is not optically active material may be contained. For example, when a liquid crystal showing positive dielectric anisotropy contains a curable compound having no mesogenic structure, it is possible to stabilize scattering state of liquid crystal phase obtained, and it is possible to provide a liquid crystal device showing uniform property even it has a large area. Such a curable compound may, for example, be alkyl acrylate, alkyl diacrylate, polyether acrylate, polyether diacrylate or a polyether type urethane acrylate. The curable compound that is not an optically active compound may further be a curable compound having a mesogenic structure. Such a curable compound having a mesogenic structure may, for example, be the following compounds (curable compounds represented by the following formulae (2) or (4) described in Patent Document 2).

Formula (2) of Patent Document 2

Formula (4) of Patent Document 2 into the liquid crystal optical device is efficiently scattered by the plurality of liquid crystal domains having different average refractive indexes.

In the liquid crystal composition of the present invention, differently from PSCT described in Patent Document 5, it is not necessary to apply a voltage at a time of curing the liquid crystal composition in the process of forming a liquid crystal/cured material composite, and it is sufficient that the curable composition is cured in a non-voltage application state, Namely, when the curable compound is a photocurable compound, a liquid crystal optical device can be obtained on only by light exposure. Further, differently from a case where the liquid crystal is dissolved in a curable compound to prepare a mixture having entirely isotropic phase and subjecting it to a polymerization phase separation method to obtain a liquid crystal/cured material composite, even in a case where liquid crystal phase having high phase transition temperature Tc is required, there is no need of heating treatment for preventing segregation of liquid crystal phase from the liquid crystal composition. Further, in the liquid crystal/cured material composite obtainable from the liquid crystal composition of the present invention, since the content of cured material is low, even in a case of forming a liquid crystal optical device If the content of the curable compound that is not optically active material in the liquid crystal composition of the present invention is too much, the haze value at a time of transparent may increase, Accordingly, it is preferred that the total amount of curable compound (the amount including a curable compound that is an optically active compound) in the liquid crystal composition of the present invention is preferably at most 20 mass %, particularly preferably at most 10 mass % based on the total amount of liquid crystal composition. Further, as described above, in a case of employing a curable compound having high HTP (ranging from about 30 to 60) as the curable compound that is an optically active material, the total amount of the curable compound is preferably at most 5 mass % based on the total amount of liquid crystal composition.

Further, in a case of providing a liquid crystal composition having positive dielectric anisotropy on an alignment film showing high pretilt angle, the alignment state of the liquid crystal composition having a nematic phase in non-cured state may be fixed to cause reduction of the contrast between on/off of voltage application. Accordingly, in this case, the total amount of the curable compound in the liquid crystal composition of the present invention is preferably at most 10 mass %, particularly preferably at most 5 mass % based on the total amount of liquid crystal composition.

On the other hand, in a case of employing a liquid composition having negative dielectric anisotropy, in order to increase contrast between transparent and scattering, it is preferred to use an alignment film showing high pretilt angle and align the liquid crystal vertically to substrates with electrodes and to cure the curable composition in that state to fix the alignment state. For this purpose, the liquid crystal composition preferably contains a predetermined amount of the curable compound having a mesogenic structure. In this case, the amount of curable compound having a mesogenic structure is preferably from 3 to 18 mass %, particularly preferably from 5 to 14 mass % based on the total amount of liquid crystal composition. Here, even in this case, the total amount of the curable compound is preferably at most 20 mass %, particularly preferably at most 15 mass % based on the total amount of liquid crystal composition.

In the liquid crystal composition of the present invention, a curing agent for initiating curing of the curable compound or a curing promoting agent (such as curing catalyst) for promoting curing may be contained. Particularly, it is preferred to employ a curing agent for initiating curing reaction. When the curable compound is a polymerizable compound, it is preferred to employ a polymerization initiator. For example, in a case of carrying out curing reaction by photopolymerization, a common photopolymerization initiator such as that of benzoin ether type, acetophenone type or phosphine oxide type may be employed. In a case of using a curing initiator or curing promoting agent, its amount is preferably at most 5 mass %, particularly preferably at most 3 mass % based on the total amount of curable compound in the liquid crystal composition.

Further, various types of compounds may be added for the purpose of improving contrast or stability. For example, in order to improve contrast, various types of anisotropic dyes such as those of anthraquinone type, stearyl type, azomethine type or azo type may be employed. In this case, the anisotropic dyes are basically preferably soluble to the liquid crystal compound and insoluble to the curable compound. Besides these, addition of e.g. an antioxidant, a UV-absorber or various types of plasticizer is preferred for the purpose of improving stability or durability.

In a case of adding these various types of compounds, the total amount is preferably at most 20 mass %, particularly preferably at most 10 mass % based on the total amount of liquid crystal composition.

Next, explanation will be made to operation of the liquid crystal optical device 1 obtainable by aligning the liquid crystal composition having positive dielectric anisotropy vertically to substrates with electrodes and curing the curable compound. When a voltage is applied between the first and second transparent electrodes 12, 22, the liquid crystal having positive dielectric anisotropy is aligned vertically by an electric field between the electrodes, and the composite layer 50 becomes to be in transparent state. On the other hand, when no voltage is applied between the first and second transparent electrodes 12, 22, as described above, since the chiral nematic liquid crystal produced in the process of curing reaction is randomly aligned between the electrodes, the composite layer 50 is presumed to be in scattering state. Thus, since the scattering state and the transparent state can be switched by switching on/off of voltage application, it is possible to display e.g. a desired image. Here, a liquid crystal optical device 1 obtainable by aligning the liquid crystal composition having negative dielectric anisotropy vertically to substrates with electrodes and curing the curable compound, may also be configured to be a liquid crystal optical device showing a scattering state at a time of voltage application and a transparent state at a time of no-voltage application.

Figure 2:
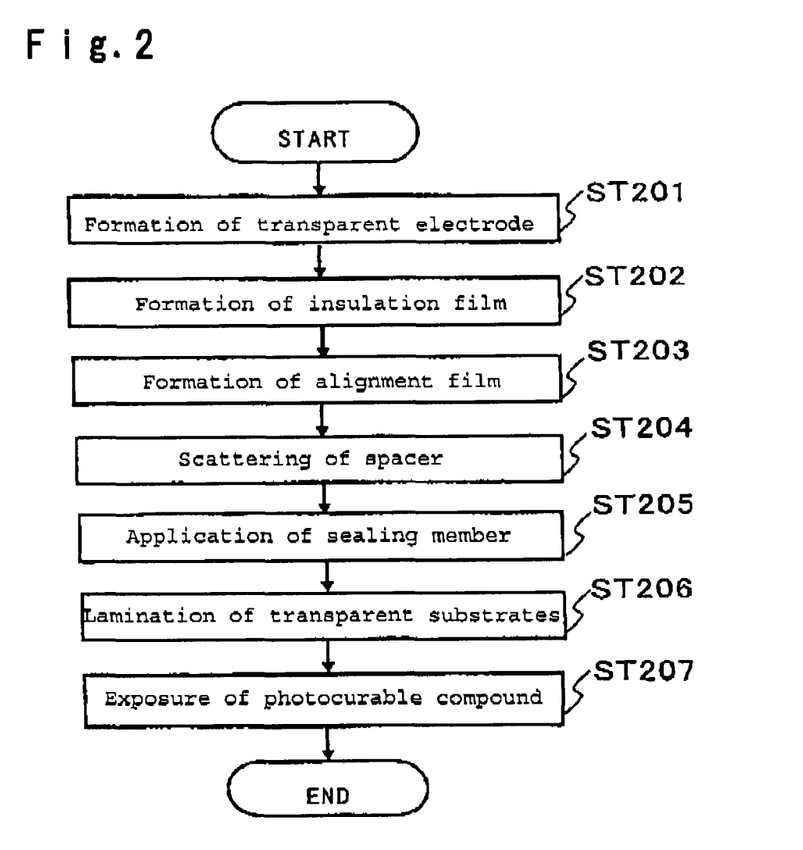
FIG. 2: A view showing an example of the production flow of the liquid crystal optical device according to an embodiment of the present invention.

Next, a process for producing the liquid crystal optical device 1 is described. FIG. 2 is a view showing an example of production flow of a liquid crystal optical device according to an embodiment of the present invention. As shown in FIG. 2, this production flow is constituted by 7 steps that are ST201 to ST207.

First, on inner face of first and second transparent substrates 11, 21, a transparent electrode films for forming second transparent electrodes 12, 22 are formed by e.g. a sputtering method or a vacuum vapor deposition method (ST201). The transparent electrode films are preferably ITO as described above. The transparent electrode films are each patterned into a desired character or pattern shape by a photolithography method, to form the first and second transparent electrodes 12, 22.

Next, the first and second insulation films 13, 23 are formed so as to cover the first and second transparent electrodes 12, 22 respectively by e.g. a sol-gel method, a sputtering method or a vacuum vapor deposition method (ST202).

Next, on the first and second insulation films 13, 23, first and second alignment films 14, 24 respectively are formed (ST203). The first and second alignment films 14, 24 are, in order to align a liquid crystal composition showing a nematic phase in a predetermined direction between a pair of substrates with electrodes, formed so as to contact with the liquid crystal. As described above, at least one of the alignment films 14, 24 formed on the transparent substrates 11, 21 respectively is formed so as to align the liquid crystal vertically to the inner faces of the transparent substrates 11, 21. Specifically, it is preferred to form an alignment film having a pretilt angle of at least 60°. It is also possible to employ an alignment film having low pretilt angle, specifically, a pretilt angle of at most 10°, but a rubbing treatment is necessary to uniformly align the liquid crystal composition in this case.

Next, on the inner face of the first or second transparent substrate 11 or 21, particles of a spacer 40 are sprayed by using a spraying machine (ST204).

Next, the inner face of the first or second transparent substrate 11 or 21, a sealing member 30 is applied along the periphery of the first or second transparent substrate 11 or 21 (ST205). Here, for the sealing member 30, e.g. a UV-curable resin or a thermosetting resin may be employed. Here, the sealing member 30 may contain a spacer.

Next, the first and second transparent substrates 11, 21 are laminated to form a cell, and the cell is filled with a liquid crystal composition (ST206). In this step, one of two seal-broken portions provided on the sealing member is immersed in the liquid crystal composition and suction is made through the other one of the seal-broken portions (suction method). Further, a seal-broken portion of a cell having a sealing member provided with at least one seal-broken portion is immersed in a liquid crystal composition put in a container in vacuum, followed by returning the environmental pressure to the atmospheric pressure, to thereby fill inside the cell with the liquid crystal composition by the pressure difference between inner pressure of the cell and the atmospheric pressure (vacuum injection method). Further, by employing ODF (one-drop-fill) method (it may also be called as liquid crystal drop method or vacuum drop method), on inner faces of the first or second transparent substrates 11, 21, a predetermined amount of liquid crystal composition may be dropped, and under a low pressure, the first and the second transparent substrates 11, 21 are laminated with a sealing member 30 interposed therebetween. This ODF method requires a vacuum equipment, but it can fill the liquid crystal composition in shorter time as compared with the suction method or the vacuum injection method, and the ODF method is effective for producing a large-sized liquid crystal optical device.

In the present invention, the liquid crystal composition is sandwiched between inner faces of transparent substrates by the above methods. Since the liquid crystal composition shows a nematic phase in a state that the liquid crystal composition is sandwiched between inner faces of the transparent substrates, it is easily possible to align the liquid crystal in one direction by an alignment film.

Here, the step of laminating the first and second transparent substrates 11, 21 with the liquid crystal composition sandwiched therebetween, may employ a method other than the above.

Next, a curable compound in the liquid crystal composition is cured (ST207). In the present invention, in a state that the liquid crystal composition is sandwiched between inner faces of the transparent substrates and that the liquid crystal is aligned, the curable compound is cured. Since the liquid crystal is aligned in one direction before the compound is cured, the curable compound can be cured in a state that no voltage is applied between electrodes.

In a case where the curable compound is a photocurable compound, the compound is cured by exposing it by using a UV light source. By the exposure, the photocurable compound is cured to form a liquid crystal/cured material composite layer 50. Further, in the case of the ODF method, when a photocurable sealing member is used as the sealing member 30, the sealing member can be cured at the same time. Here, in a case where no photocurable resin is employed for the sealing member 30, curing of the sealing member needs to be carried out separately.

EXAMPLES

Examples of the present invention are shown below, but the present invention should not be construed as limited to the following Examples.

Haze values were measured by using a direct read haze computer manufactured by Suga Test Instruments Co., Ltd.

Example 1

To a nematic liquid crystal (product name BL-002 manufactured by Merck & Co., Inc., Tc=72° C., $\Delta n$=0.246, $\Delta \in$=16) showing positive dielectric anisotropy, a levo-rotatory optically active material (S-1011 manufactured by Merck & Co., Inc., HTP in the nematic liquid crystal is 38) in a amount of 3.0 mass % was added based on the amount of liquid crystal composition, to prepare a chiral nematic liquid crystal having a helical pitch of about 0.82 µm. Next, a dextro-rotatory optically active material (Paliocolor LC756 manufactured by BASF Corporation, HTP in the nematic liquid crystal is 56) was added to form again a nematic liquid crystal having a helical pitch of 18 µm. The above dextro-rotatory optically active material is a photocurable compound, and its content in the liquid crystal composition is 2.0 mass %. Further, a photopolymerization initiator (benzoin isopropyl ether) is added in an amount of about 1 mass % based on the photocurable compound contained in the liquid crystal composition, to obtain a liquid crystal composition (liquid crystal composition A) according to the present invention. With respect to this liquid crystal composition A, in order to measure the twist angle when the cell gap is 6 µm, the liquid crystal composition A was sandwiched between a pair of glass substrates each having an inner face provided with a polyimide thin film showing a pretilt angle of at most 10° as an alignment film, together with a slight amount of a spherical spacer having a diameter of 6 µm. Here, as one side of those polyimide thin films, one subjected to a rubbing treatment was employed. The glass substrates sandwiching the liquid crystal composition A was observed by using a polarizing optical microscope, and as a result, the twist angle of the liquid crystal composition A was about 120°.

Next, a pair of glass substrates each having an inner face provided with an ITO thin film (indium tin oxide) as a transparent electrode are prepared, and on the ITO electrode, a metal oxide thin film (MIC-55 manufactured by SEIMI CHEMICAL CO., LTD.) of $SiO_2$—$TiO_2$ type of about 50 nm thick was formed as an insulation layer. Further, on the insulation layer, an alignment film made of polyimide thin film having a pretilt angle of about 90° is formed. The pair of glass substrates was positioned so as to oppose to each other via a spacer that comprises resin beads of 6 µm in diameter, and they were sealed together with an epoxy resin other than a hole for injecting the liquid crystal composition, to prepare a cell. Into the cell, the above liquid crystal composition A is injected at a room temperature by a vacuum injection method, and the injection hole was sealed with a room-temperature curable sealing member. After the injection hole was sealed, the cell was observed, and as a result, the cell showed a transparent state having little haze. Then, the cell was exposed to UV-rays incident from glass substrate surfaces on both sides, that has a center wavelength of 365 nm and an intensity of 30 W/m$^2$, at a room temperature for 10 minutes to cure the curable compound to thereby obtain a liquid crystal optical device.

After the exposure of WV rays, the liquid crystal optical device showed an opaque state in white. Next, is when a rectangular wave voltage of 200 Hz and 30 V was applied between the pair of ITO electrodes, and as a result, the liquid crystal optical device became transparent. Namely, a liquid crystal optical device was obtained, which showed a transparent state at a time of voltage application and a scattering state at a time of no-voltage application. In the transparent state, the haze value was at most 2% and its transparency was good. Further, the device of transparent state was observed in a state that observing direction was tilted from the direction perpendicular to the glass substrate, and as a result, increase of haze was hardly observed. By a Schlieren optical system of light collection angle of 5°, the contrast between transparent state and opaque state in white of this device was measured at a room temperature, and as a result, it was 25.

By employing the liquid crystal composition A of the present invention, differently from PSCT described in Patent Document 5, there is no need of applying voltage to the liquid crystal composition in a process of forming a liquid crystal optical device, and it is sufficient that a chiral agent having curability is cured. By employing the photocurable compound as in this embodiment, only by light exposure, a chiral agent having curability is cured to divide a liquid crystal into a plurality of domains, whereby the liquid crystal changes from nematic phase to chiral nematic phase. Accordingly, a liquid crystal optical device can be extremely easily obtained, which shows a transparent state at a time of voltage application and a scattering state at a time of no-voltage application. Further, by employing a vertical alignment film, rubbing treatment can be omitted. Further, in the liquid crystal optical device according to Example 1, since the content of cured material is low, haze value in transparent state is small, and its transparency is good regardless of angle of observing the device. Further, its contrast between transparent state and opaque state in white is also high.

Example 2

A liquid crystal optical device was produced in the same manner as Example 1 except that instead of the alignment film employed in Example 1, an alignment film having a pretilt angle of at most 10° on a face in contact with the liquid crystal composition A and subjected to a rubbing treatment was employed. In this device, the glass substrates were positioned so as to oppose to each other so that rubbing directions of their alignment films are perpendicular to each other. The liquid crystal device after it was exposed to UV-rays to cure the curable compound, showed an opaque state in white. Next, in the same manner as above, a rectangular voltage of 200 Hz and 60 V was applied between the pair of ITO electrodes, and as a result, the liquid crystal optical device became transparent. Namely, a liquid crystal optical device was obtained, which showed a transparent state at a time of voltage application and a scattering state at a time of no-voltage application. The haze value in the transparent state was 4%. The device of transparent state was observed in a state that observation direction is tilted from a direction perpendicular to glass substrate, and as a result, slight increase of haze was observed, but the transparency was still good, In the same manner, by using a Schlieren optical system having a light collection angle of 5°, the contrast between transparent state and scattering state of this device was observed at a room temperature, and as a result, it was 12.

By employing the liquid crystal composition A according to the present invention, even in a case of employing a horizontal alignment film, by applying a rubbing treatment, in the same manner as the above Example 1, a liquid crystal device can be easily obtained, which shows a transparent state at a time of voltage application and a scattering state at a time of no-voltage application. The optical characteristics of the liquid crystal optical device according to Example 2 are, as compared with the above Example 1, generally slightly poor but still good.

Example 3

To a nematic liquid crystal (Tc=94°, Δn=0.230, Δε=15) showing positive dielectric anisotropy, a levo-rotatory is optically active material (HTP becomes about 24 when it is dissolved in the above nematic liquid crystal at a concentration of 10 mass %) in an amount of 3.5 mass % was added based on the amount of liquid crystal composition, to prepare a chiral nematic liquid crystal having a helical pitch of about 1.2 μm. Next, to the liquid crystal, a dextro-rotatory optically active material (Paliocolor LC756 manufactured by BASF Corporation, HTP in the nematic liquid crystal is 55) having curability was added, to make the liquid crystal again to a nematic liquid crystal having a helical pitch of at least 40 μm. The content of the dextro-rotatory optically active material in the liquid crystal composition is 1.8 mass %. Further, a photopolymerization initiator (benzoin isopropyl ether) in an amount of about 1 mass % based on the photocurable compound contained in the liquid crystal composition was added, to obtain a liquid crystal composition (liquid crystal composition B). In order to measure the twist angle of the liquid crystal composition B when the cell gap is 10 μm, in the same manner as Example 1, the liquid crystal composition B was sandwiched between a pair of glass substrates each provided with a polyimide film having a pretilt angle of at most 10° as an alignment film together with a slight amount of spherical spacer having a diameter of 10 μm. Here, as one side of the polyimide thin films, one subjected to rubbing treatment was employed. Class substrates sandwiching the liquid crystal composition B was observed by a polarizing microscope, and as a result, the twist angle of the liquid crystal composition B was at most 90°.

Next, a cell having a polyimide alignment film showing a pretilt angle of about 90° formed on a substrate surface that contact with the liquid crystal composition B, was prepared in the same manner as Example 1 except that spacers of 10 μm in diameter was provided between transparent electrodes, and the liquid crystal composition B was injected into the cell by a vacuum injection method, and an injection hole was sealed. The cell showed a uniform transparent state with low haze. The cell was exposed to UV rays incident from both substrate surfaces in the manner as Example 1, to obtain a liquid crystal optical device.

After the exposure of UV rays, the liquid crystal optical device showed an opaque state in white. Next, between the pair of ITO electrodes, a rectangular wave voltage of 200 Hz and 40 V was applied, and as a result, the liquid crystal optical device became transparent. The haze value in the transparent state was at most 2%. Further, the device of transparent state was observed in a direction tilted from a direction perpendicular to the glass substrate, and as a result, increase of haze was hardly observed. By using a Schlieren optical system having light collection angle of 5°, the contrast between transparent state and scattering state of the device was measured at a room temperature, and as a result, it was 8.

Also in the case of employing the liquid crystal composition B of Example 3, a liquid crystal optical device showing a transparent state at a time of voltage application and a scattering state at a time of no-voltage application can be obtained extremely easily. Further, by employing a vertical alignment film, a rubbing treatment can be omitted. Further, the optical characteristics of the liquid crystal optical device of Example 3 are good although the contrast is inferior to that of the liquid crystal optical device of Example 1.

Example 4

To the nematic liquid crystal composition B prepared in Example 3, a curable compound (curable compound P) represented by the following chemical formula (1) that is not an optically active material, was added so that its content becomes 1.7 mass % based on the total composition including (1).

The curable compound P is a curable compound having no mesogenic structure in its molecule. Further, a photopolymerization initiator (benzoin isopropyl ether) in an amount of about 1 mass % based on the curable compound P was further added to prepare a liquid crystal composition (liquid crystal composition C) Since the curable compound P is not an optically active material, the helical pitch of the liquid crystal composition C is not different from the helical pitch of the liquid crystal composition B.

Next, a cell having a polyimide alignment film showing a pretilt angle of about 90° formed on a substrate surface that contact with the liquid crystal composition C, was prepared in the same manner as Example 1 except that a spacer of spherical beads of 10 μm in diameter was provided between transparent electrodes, and the liquid crystal composition C was injected into the cell by a vacuum injection method, and an injection hole was sealed. The cell showed a transparent state with low haze. The cell was exposed to UV rays incident from both substrate surfaces in the same manner as Example 1 to obtain a liquid crystal optical device.

After the exposure of UV rays, the liquid crystal optical device showed an opaque state in white. Next, a rectangular wave voltage of 200 Hz and 40 V was applied between the pair of ITO electrodes, and as a result, the liquid crystal optical device became transparent. The haze value in the transparent state was at most 2%. When the device in the transparent state was observed in a is direction tilted from a direction perpendicular to the glass substrate, the haze was low and the device showed a good transparency. Further, the contrast between the transparent state and the scattering state of the device was measured by using a schlieren optical system having a light collection angle of 5° at a room temperature, and as a result, it was 15.

Also in the case of employing the liquid crystal composition of Example 4, a liquid crystal optical device showing a transparent state at a time of voltage application and a scattering state at a time of non-voltage application can be easily obtained, Further, by employing a vertical alignment film, it is possible to omit rubbing treatment. Further, the optical characteristics of the liquid crystal optical device of Example 4 is better than the optical characteristics of the liquid crystal optical device of Example 2 employing the same nematic liquid crystal, since the device of Example 2 contains the curable compound P and shows better contrast.

Example 5

To a nematic liquid crystal (product name BL-002 manufactured by Merck & Co., Inc., Tc=72° C., Δn=0.246, Δ∈=16) showing positive dielectric anisotropy, that is the same as that of Example 1, a levo-rotatory optically active material (its HTP is about 27 when it is dissolved in the nematic liquid crystal at a concentration of 10 mass %) was added so that its content becomes 3.1 mass % based on the liquid crystal composition, to prepare a chiral nematic liquid crystal having a helical pitch of about 1.2 μm, Next, a dextro-rotatory optically active material (Paliocolor LC756 manufactured by BASF Corporation) having curability was added to produce again a nematic liquid crystal having a helical pitch of about 20 μm, The content of the dextro-rotatory optically active material in the liquid crystal composition is 1.5 mass %. Further, a photopolymerization initiator (benzoin isopropyl ether) was added to the liquid crystal composition so that the content became about 1 mass % based on the photocurable compound contained in the liquid crystal composition, to obtain a liquid crystal composition (liquid crystal composition D). With respect to the liquid crystal composition D, in order to measure the twist angle when the cell gap is 8 μm, the liquid crystal composition D was sandwiched between a pair of glass substrates whose inner faces are provided with a polyimide thin film as an alignment film showing a pretilt angle of at most 10°, together with a slight amount of spherical spacer of 8 μm in diameter. At this time, for the polyimide thin film of one side, one subjected to rubbing treatment was employed. The glass substrates sandwiching the liquid crystal composition D were observed by a polarizing microscope, and as a result, the twist angle of the liquid crystal composition D was about 140°.

Next, a cell provided with a polyimide alignment films showing a pretilt angle of about 90° formed on substrate surfaces in contact with the liquid crystal composition D, was prepared in the same manner as Example 1 except that spherical beads of 8 μm in diameter as a spacer was provided between the transparent electrodes, and the liquid crystal composition D was injected into the cell by a vacuum injection method, and the injection hole was sealed. The cell showed a uniform transparent state with low haze. The cell was exposed to UV rays incident from both substrate surfaces in the same condition as those of Example 1 to obtain a liquid crystal optical device.

After the UV exposure, the liquid crystal optical device showed an opaque state in white. Next, a rectangular wave voltage of 200 Hz and 30 V was applied between the pair of ITO electrodes, and as a result, the liquid crystal optical device became transparent. The haze value in the transparent state was at most 2%, and when the transmittance of the device for incident light in perpendicular direction to glass substrate was measured by a Schlieren optical system having light collection angle of 5°, the transmittance was 84% including reflections on the substrate surfaces and absorption of incident light in the transparent electrodes. Next, by using the same measurement system, the device was tilted by 45° to the incident light and measured the transmittance, and as a result, it hardly changed and it was 83%. By using the same measurement optical system, the contrast between the transparent state and scattering state of the device was measured at a room temperature, and as a result, it was 15.

Also in the case of employing the liquid crystal composition D of Example 5, a liquid crystal optical device showing a transparent state at a time of voltage application and a scattering state at a time of no-voltage application can be easily obtained. Further, by employing a vertical alignment film, rubbing treatment can be omitted. Further, the optical characteristics of the liquid crystal device of Example 5 are better than the optical characteristics of the liquid crystal device of Example 1 although the contrast is slightly inferior.

Example 6

To a nematic liquid crystal (Tc=105° C., Δn=0.202, Δ∈=5.1) showing negative dielectric anisotropy, a levo-rotatory optically active material (its HTP is about 23 when it is dissolved in the nematic liquid crystal at a concentration of 10 mass %) was added so that its content becomes 2.9 mass % based on the liquid crystal composition, to prepare a chiral nematic liquid crystal having a helical pitch of about 1.5 μm. Next, a curable dextro-rotatory optically active material (Paliocolor LC756 manufactured by BASF Corporation, its HTP in the nematic liquid crystal is 44) was added to again prepare a nematic liquid crystal having a helical pitch of about 23 μm. The content of the dextro-rotatory optically active material in the liquid crystal composition is 1.5 mass %. Further, a photopolymerization initiator (benzoin isopropyl ether) was added so that its content becomes about 1 mass % based on the photocurable compound contained in the liquid crystal composition, to obtain a liquid crystal composition (liquid crystal composition E). With respect to the liquid crystal composition E, in order to measure the twist angle in a case where the cell gap is 6 μm, in the same manner as Example 1, the liquid crystal composition E was sandwiched between a pair of glass substrates having inner faces each provided with a polyimide thin film showing a pretilt angle of at most 10° as alignment films, together with a slight amount of spherical spacers of 6 μm in diameter. At this time, for the polyimide thin film of one side, one subjected to a rubbing treatment was employed. The glass substrates sandwiching the liquid crystal composition E were observed by a polarizing microscope, and as a result, the twist angle of the liquid crystal composition E was about 90°.

Next, a cell provided with polyimide alignment films having a pretilt angle of about 90° formed on substrate surfaces in contact with the liquid crystal composition E, was prepared in the same manner as Example 1 except is that the spherical beads of 6 μm in diameter as a spacer was provided between the transparent electrodes, and the liquid crystal composition E was injected into the cell by a vacuum injection method, and the injection hole was sealed. The cell showed a uniform transparent state with low haze. In the same manner as Example 1, the cell was exposed to UV rays incident from both substrate surfaces to obtain a liquid crystal optical device.

After the exposure of UV rays, the liquid crystal optical device showed a transparent state with slight opaqueness in white, Next, a rectangular wave voltage of 200 Hz and 15 V was applied to the pair of ITO electrodes, and as a result, the transparency of the liquid crystal optical device slightly increased, and the transparency measured by a Schlieren optical system having light collection angle of 5° was 65%. Next, a rectangular wave voltage of 200 Hz and 60 V was applied between the ITO electrodes, as a result, the device showed a scattering state, the transmittance by the same measurement system was 5%, and the contrast between the transparent state and scattering state was 13. An electrooptical device whose degree of scattering intensity increases by voltage application was obtained.

Example 7

To a nematic liquid crystal (Tc=96° C., Δn=0.200, Δ∈=−5.0) showing negative dielectric anisotropy, a levo-rotatory optically active material (HTP was about 22 when is it is dissolved in the nematic liquid crystal at a content of 10 mass %) was added so that its content became 1.1 mass % based on the liquid crystal composition, to prepare a chiral nematic liquid crystal having a helical pitch of about 4 μm. Next, a curable dextro-rotatory optically active material (Paliocolor LC756 manufactured by BASF Corporation, its HTP in the nematic liquid crystal is 50) was added, to again produce a nematic liquid crystal having a helical pitch of about 23 μm. The content of the dextro-rotatory optically active material in the liquid crystal composition is 0.5 mass %. Further, a curable compound (curable compound R) represented by the following chemical formula (2) that is not an optically active material, was added so that its content becomes 10 mass % based on the total composition including (2).

The curable compound R is a curable compound having a mesogenic structure in its molecule. Further, a photopolymerization initiator (benzoin isopropyl ether) in an amount of about 1 mass % based on the total curable compound contained was further added to prepare a liquid crystal composition (liquid crystal composition F). Since the curable compound R is not an optically active material, the liquid crystal composition F is also a nematic liquid crystal having a helical pitch of about 23 μm. With respect to the liquid crystal composition F, in is order to measure twist angle in a case where the cell gap is 10 μm, in the same manner as Example 1, the liquid crystal composition F was sandwiched between a pair of glass substrates having inner faces each provided with a polyimide thin film having a pretilt angle of at most 10° as an alignment film, together with a slight amount of spherical spacers of 10 μm in diameter. At this time, as one of the polyimide thin films, one subjected to a rubbing treatment was employed. When the glass substrates sandwiching the liquid crystal composition F were observed by a polarizing microscope, the twist angle of the liquid crystal composition F was about 160°.

Next, a cell provided with a polyimide alignment films having a pretilt angle of 90° formed on substrate surfaces in contact with the liquid crystal composition F, was prepared in the same manner as Example 1 except that spherical beads of 10 μm in diameter as a spacer was provided between the transparent electrodes, and the liquid crystal composition F was injected into the cell by a vacuum injection method, and the injection hole was sealed. The cell showed a uniform transparent state with low haze. The cell was exposed to UV rays incident from both substrate surfaces in the same manner as Example 1 to obtain a liquid crystal optical device.

After the UV exposure, the liquid crystal optical device showed a transparent state with a slight haze. Next, when a rectangular wave voltage of 200 Hz and 40 V was applied between the pair of ITO electrodes, the device showed a strong scattering state. The contrast between the transparent state and scattering state of the device was measured by using a Schlieren optical system having light collection angle of 5° at a room temperature, and as a result, it was 17. An electrooptical device whose degree of scattering intensity is increased by voltage application was obtained.

Example of Synthesis Example of Synthesizing Compound 3

In an eggplant flask, isosorbide (0.5 g, 3.4 mmol), 4-(6-acryloyloxy-hexyloxy)benzoic acid (2.0 g, 6.8 mmol), 1-ethyl-3-(3-dimethylaminopropyl)carbodiimide hydrochloride (1.3 g, 10.2 mmol) and 4-dimethylaminopyridine (0.03 g) were dissolved in dichloromethane (100 mL). It was stirred in a nitrogen atmosphere at a room temperature for two hours, and thereafter, it was subjected to a heating-reflux treatment in an oil bath heated at 40° C. for 8 hours. Solid product was filtered out, and an organic layer was cleaned with an ion exchanged water of about pH 4, with a sodium bicarbonate (2)

water and with an ion-exchanged water in this order, to carry out an extraction operation. The organic layer was dried by magnesium sulfate anhydride, and filtered, and dichloromethane was removed by distillation by using a rotary evaporator. A residue obtained was subjected to purification operation by a column chromatography (solvent; hexane:

ethyl acetate=2:1). A white solid product obtained was further recrystallized in ethanol to obtain an objective compound. The amount obtained was 0.62 g, and the yield was 26%.

(3)

Example 8

To a nematic liquid crystal (product name BL-002 manufacture by Merck & Co., Tc=72° C., Δn=0.246, Δ∈=16) showing positive dielectric anisotropy, a levo-rotatory optically active material (S-1011 manufactured by Merck & Co.) was added in an amount of 2.3 mass % based on the liquid crystal composition, to prepare a chiral nematic liquid crystal having a helical pitch of about 1.2 μm. Next, the dextro-rotatory optically active material (curable compound 3, HTP in the nematic liquid crystal was 42) obtained in the Synthesis Example and represented by formula (3), was added to again produce a nematic liquid crystal having a helical pitch of at least about 40 μm. The dextro-rotatory optically active material is a photocurable compound, and the content in the liquid crystal composition is 1.9 mass %. Further, a photopolymerization initiator (benzoin isopropyl ether) in an amount of abut 1 mass % based on the photocurable compound contained in the liquid crystal composition, was added, to obtain a liquid crystal composition (liquid crystal composition H) according to the present invention. With respect to the liquid crystal composition H, in order to measure the twist angle when the cell gap is 10 μm, the liquid crystal composition H was sandwiched between a pair of glass substrates having inner surfaces each provided with a polyimide thin film showing a pretilt angle of at most 10° as alignment films, together with a slight amount of a spherical spacers having a diameter of 10 μm. Here, for the polyimide thin film on one of the inner surfaces, one subjected to a rubbing treatment was employed. When the glass substrates sandwiching the liquid crystal composition H were observed by a polarizing microscope, the twist angle of the liquid crystal composition H was at most 90°.

Next, a cell provided with polyimide alignment films showing a pretilt angle of about 90° formed on substrate surfaces that contact with the liquid crystal composition H, was prepared in the same manner as Example 1 except that the diameter of the spacer was 10 μm, and the liquid crystal composition H was injected into the cell by a vacuum injection method, and the injection holes was sealed. The cell showed a uniform transparent state with low haze. The cell was exposed to UV rays incident from both substrate surfaces in the same manner as Example 1 to obtain a liquid crystal optical device.

After the UV exposure, the liquid crystal optical device showed an opaque state in white. Next, a rectangular wave voltage of 200 Hz and 60 V was applied between the pair of ITO electrodes, and as a result, the liquid crystal optical device became transparent. Namely, a liquid crystal optical device was obtained which showed a transparent state at a time of voltage application and a scattering state at a time of no-voltage application. The haze value in the transparent state was at most 2%, and the transparency was good. Further, when the device was observed in a direction tilted from a direction perpendicular to the glass substrates, increase of haze was hardly observed. By using a Schlieren optical system having light collection angle of 5°, the contrast between the transparent state and scattering state of this device was observed at a room temperature, and as a result, it was 13. An device whose degree of scattering intensity increased by voltage application was obtained.

While the liquid crystal composition according to Examples 1 to 5 and 8 show positive dielectric anisotropy, the liquid crystal compositions E and F according to Examples 6 and 7 show negative dielectric anisotropy. In the cases of Examples 6 and 7, liquid crystal optical devices showing a scattering state at a time of voltage application and showing more transparent state at a time of no-voltage application can be easily obtained. Further, by employing a vertical alignment film, it is possible to omit rubbing treatment. Further, the liquid crystal optical devices according to Examples 6 and 7, show a relatively high contrast between transparent state and scattering state.

Comparative Example 1

As a curable compound, urethane acrylate oligomer (Aronix M1200 manufactured by Toagosei Co., Ltd.) and isooctyl acrylate were blended so that their weight ratio became 12/7 to obtain a uniform curable composition (curable composition Q). Next, a nematic liquid crystal (product name BL-002 manufactured by Merck & Co., Tc=72° C., Δn=0.246, Δ∈=16) and the curable composition Q were blended so that their weight ratio became 31/19 to obtain a uniform composition. Further, a photopolymerization initiator (benzoin isopropyl ether) in an amount of about 1 mass % based on the curable composition contained, was added and uniformly dissolved to obtain a composition (composition G). At a room temperature, the composition G became isotropic phase showing no liquid crystal state, and showed a uniform transparent state.

Next, a cell provided with polyimide alignment films showing a pretilt angle of at most 10° formed on substrate surfaces that contact with the composition G, was prepared in the same manner as Example 2 except that spherical beads of 8 μm in diameter as a spacer was provided between transparent electrodes, and the liquid crystal composition G was injected into the cell by a suction injection method, and the injection hole was sealed. In order to use the suction injection method, at least two holes were provided at the sealing portion. After the injection of composition G, the cell showed a uniform transparent state. Next, at a room temperature, the cell was subjected to UV rays having a central wavelength of 365 nm and an irradiation intensity of 10 W/m$^2$ incident from glass substrates on both sides, for three minutes to cure the liquid crystal composition G, to thereby obtain a liquid crystal optical device.

After the UV exposure, the liquid crystal optical device showed an opaque state in white. Next, a rectangular wave voltage of 200 Hz and 40 V was applied between the pair of ITO electrodes, and as a result, the liquid crystal optical device became transparent. The haze value in the transparent state was at most 2%, and when the transparency of the device for incident light in a direction perpendicular to the glass substrates of the device was observed by using a Schlieren optical system having collection angle of 5°, the transparency was 84% including reflection on glass substrate surfaces and absorption in the transparent electrode layers. Next, the transmittance was measured in the same measurement system under the condition that the device was tilted by 45° to the incident light, and as a result, the transmittance was 72%. When the device in transparent state was observed as the observation direction was tilted from the direction perpendicular to the glass substrates, the haze gradually increased, and the good transparency was gradually lost. In the same measurement optical system, the contrast between transparent state and scattering state of the device was measured at a room temperature, and as a result, it was 5.

INDUSTRIAL APPLICABILITY

The liquid crystal device according to the present invention is suitable particularly for sunroofs of automobiles, and the device can be also used for other applications. For example, it is applicable to windows (for automobiles (side windows, door glasses, rear quarters etc.), for architectures, for airplanes, for ships, for railroad vehicles etc.), skylights, partitions, materials for interior or exterior of architectures such as doors, sign boards, commercial advertising mediums, large-sized partition equipment, projection screens combined with projection type display devices, finders for cameras or digital cameras or the like. By employing the device for a door of a refrigerator, it is possible to recognize foods contained in the refrigerator without opening the door of refrigerator. Further, it is possible to display graphics and patterns combined together or to display characters to provide information to users. Further, decorations such as characters may be provided on a transparent plate as the case requires.

The entire disclosure of Japanese Patent Application No. 2006-176079 filed on Jun. 27, 2006 including specification, claims, drawings and summary is incorporated herein by reference in its entirety.

What is claimed is:

1. A liquid crystal composition containing a nematic liquid crystal and at least two types of optically active materials having different optical rotatory directions, wherein one of the optically active materials having different optical rotatory directions is a non-curable compound, the other one of the optically active materials is a curable compound, and the liquid crystal composition as a whole shows a nematic phase.

2. The liquid crystal composition according to claim 1, which shows a chiral nematic phase when the optically active material being a curable compound is not present, and which as a whole shows a nematic phase when the liquid crystal composition contains the optically active material being a curable compound.

3. The liquid crystal composition according to claim 1, which is a liquid crystal composition further containing a curable compound that is not an optically active material.

4. The liquid crystal composition according to claim 1, wherein the total amount of the curable compound is from 0.1 to 20 mass % based on the total amount of the liquid crystal composition.

5. The liquid crystal composition according to claim 1, which shows a twist angle of at most 360° when it is sandwiched between a pair of substrate at least one of which has an inner surface provided with an alignment film having a pretilt angle of at most 10°.

6. The liquid crystal composition according to claim 1, which has positive dielectric anisotropy.

7. A liquid crystal optical device comprising a pair of insulative substrates at least one of which is transparent, an electrode formed on an inner face of each of the insulative substrates, and a composite of liquid crystal and cured material sandwiched between the inner faces of the insulative substrates;
wherein the composite is obtainable by curing the curable compound in the liquid crystal composition as defined in claim 1 in a state that the liquid crystal composition is sandwiched between the inner faces of the insulative substrates and that the liquid crystal is aligned.

8. The liquid crystal optical device according to claim 7, which is obtained by curing the curable compound in a state that no voltage is applied to the electrodes.

9. The liquid crystal optical device according to claim 7, wherein at least one of the insulative substrates is provided with an alignment film having a pretilt angle of at least 60°.

10. A process for producing liquid crystal optical device having a composite of liquid crystal and cured material, which comprises a step of forming an electrode on each inner face of a pair of insulative substrates at least one of which is transparent, a step of laminating the insulative substrates so as to sandwich the liquid crystal composition as defined in claim 1 between them so that the inner faces of the respective insulative substrates are opposed to each other, and a step of curing the curable compound in the liquid crystal composition in a state that the liquid crystal composition is sandwiched between the inner faces of the insulative substrates and that the liquid crystal is aligned, to form the composite.

11. The process for producing liquid crystal optical device according to claim 10, wherein the curing of the curable compound is carried out in a state that no voltage is applied to the electrodes.

12. The process for producing liquid crystal device according to claim 10, which further comprises a step of forming on at least one of the insulative substrates an alignment film having a pretilt angle of at least 60°.

13. A process for producing liquid crystal composition, which comprises a step of adding to a composition containing a nematic liquid crystal and at least one type of first optically active material and showing a chiral nematic phase, at least one type of second optically active material having an optical rotatory direction different from the optical rotatory direction of the first optically active material, in an amount that makes the liquid crystal composition as a whole shows a nematic phase; wherein one of the first optically active material and the second optically active material is a curable compound, and the other one is a non-curable compound.

14. The process for producing liquid crystal composition according to claim 13, wherein the first optically active material is a non-curable compound and the second optically active material is a curable compound.

* * * * *